United States Patent
Karaburun

(10) Patent No.: US 11,790,283 B2
(45) Date of Patent: Oct. 17, 2023

(54) PARKING SPACE LOCK AND SYSTEM AND METHOD FOR PROVIDING PARKING SERVICE

(71) Applicant: Bayerische Motoren Werke Aktiengesellschaft, Munich (DE)

(72) Inventor: Sinan Karaburun, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 515 days.

(21) Appl. No.: 16/759,185

(22) PCT Filed: Jan. 10, 2018

(86) PCT No.: PCT/CN2018/072126
§ 371 (c)(1),
(2) Date: Apr. 24, 2020

(87) PCT Pub. No.: WO2019/136638
PCT Pub. Date: Jul. 18, 2019

(65) Prior Publication Data
US 2020/0279196 A1 Sep. 3, 2020

(51) Int. Cl.
*G06Q 10/02* (2012.01)
*H04W 4/44* (2018.01)
(Continued)

(52) U.S. Cl.
CPC .............. *G06Q 10/02* (2013.01); *B60L 53/12* (2019.02); *B60L 53/35* (2019.02); *G01S 19/42* (2013.01);
(Continued)

(58) Field of Classification Search
CPC ...... G06Q 10/02; G06Q 20/127; G06Q 30/04; G06Q 2240/00; H04W 4/44; B60L 53/12;
(Continued)

(56) References Cited

U.S. PATENT DOCUMENTS 6,150,958 A * 11/2000 Worsham .............. E01F 13/085
404/6
6,937,139 B2 * 8/2005 Nuesser ............. G07C 9/00182
340/5.1

(Continued)

FOREIGN PATENT DOCUMENTS

CN       1277706 A  * 12/2000 ............... G08G 1/20
CN     100565555 C  * 12/2009
(Continued)

OTHER PUBLICATIONS

Thanh Nam Pham, "A cloud based smart parking system based on Internet of things Technologies", published by IEEE Access on Aug. 16, 2015, all pages (Year: 2015).*
(Continued)

*Primary Examiner* — Omar Zeroual
(74) *Attorney, Agent, or Firm* — Crowell & Moring LLP

(57) ABSTRACT

A parking space lock, as well as a system and a method are disclosed, which provide a vehicle with a parking service. The parking space lock includes a fixing portion fixed in a parking space; a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state; a first communication portion configured to communicate with a service device; a control portion configured to, when receiving a first signal from the service device by the first communication portion, control the movable portion to move to/to be at the first position and maintain the parking space lock in the locked state.

13 Claims, 9 Drawing Sheets

(51) Int. Cl.
| | |
|---|---|
| *B60L 53/12* | (2019.01) |
| *B60L 53/35* | (2019.01) |
| *G07C 9/10* | (2020.01) |
| *G01S 19/42* | (2010.01) |
| *G06Q 20/12* | (2012.01) |
| *G06Q 30/04* | (2012.01) |
| *G08G 1/017* | (2006.01) |
| *G08G 1/14* | (2006.01) |
| *G08G 1/00* | (2006.01) |

(52) U.S. Cl.
CPC ........... *G06Q 20/127* (2013.01); *G06Q 30/04* (2013.01); *G07C 9/10* (2020.01); *G08G 1/017* (2013.01); *G08G 1/142* (2013.01); *G08G 1/146* (2013.01); *G08G 1/149* (2013.01); *G08G 1/20* (2013.01); *H04W 4/44* (2018.02); *G06Q 2240/00* (2013.01)

(58) Field of Classification Search
CPC B60L 53/35; G07C 9/10; G01S 19/42; G08G 1/017; G08G 1/142; G08G 1/146; G08G 1/149; G08G 1/20
See application file for complete search history.

(56) References Cited

U.S. PATENT DOCUMENTS

| | | | | |
|---|---|---|---|---|
| 7,075,451 | B2* | 7/2006 | Yamada | G07F 17/13 |
| | | | | 701/414 |
| 7,150,688 | B1* | 12/2006 | Coulbourn | A63B 71/022 |
| | | | | 473/415 |
| 8,678,701 | B1* | 3/2014 | Aldasem | E01F 13/085 |
| | | | | 404/11 |
| 8,730,063 | B1* | 5/2014 | Souther | E01F 13/123 |
| | | | | 404/6 |
| 8,742,949 | B2* | 6/2014 | Chang | G08G 1/149 |
| | | | | 340/932.2 |
| 10,094,081 | B1* | 10/2018 | Gill | E01F 13/028 |
| 10,604,021 | B2* | 3/2020 | Brown | B60L 53/124 |
| 10,788,580 | B1* | 9/2020 | Kavaler | G01S 13/0209 |
| 10,825,116 | B2* | 11/2020 | Mukundala | G08G 1/149 |
| 2002/0171562 | A1* | 11/2002 | Muraki | G08G 1/14 |
| | | | | 340/988 |
| 2004/0068433 | A1* | 4/2004 | Chatterjee | G06Q 20/127 |
| | | | | 705/13 |
| 2006/0109142 | A1* | 5/2006 | Ponert | G01V 3/08 |
| | | | | 340/941 |
| 2009/0198443 | A1* | 8/2009 | Yamazaki | G01C 21/3605 |
| | | | | 701/414 |
| 2011/0015934 | A1* | 1/2011 | Rowe | G06Q 30/0259 |
| | | | | 340/932.2 |
| 2011/0035261 | A1* | 2/2011 | Handler | B60L 53/665 |
| | | | | 705/13 |
| 2012/0044046 | A1* | 2/2012 | Al-Jafar | E01F 13/085 |
| | | | | 340/5.2 |
| 2012/0044091 | A1* | 2/2012 | Kim | G08G 1/143 |
| | | | | 340/932.2 |
| 2012/0130891 | A1* | 5/2012 | Bogaard | B60L 53/60 |
| | | | | 705/40 |
| 2012/0286968 | A1* | 11/2012 | Jones | G06Q 30/0284 |
| | | | | 340/870.02 |
| 2012/0327228 | A1* | 12/2012 | Nomura | G08G 1/04 |
| | | | | 348/143 |
| 2013/0027218 | A1* | 1/2013 | Schwarz | G08G 1/017 |
| | | | | 340/870.02 |
| 2013/0117078 | A1* | 5/2013 | Weik, III | G06Q 10/00 |
| | | | | 705/13 |
| 2014/0085109 | A1* | 3/2014 | Stefik | G08G 1/14 |
| | | | | 340/932.2 |
| 2014/0195281 | A1* | 7/2014 | Stefik | G06Q 10/02 |
| | | | | 705/5 |
| 2014/0225763 | A1* | 8/2014 | Kavaler | G08G 1/142 |
| | | | | 342/70 |
| 2014/0311996 | A1* | 10/2014 | Oviatt | B62H 5/06 |
| | | | | 211/5 |
| 2014/0350855 | A1* | 11/2014 | Vishnuvajhala | G07C 1/30 |
| | | | | 701/538 |
| 2015/0120183 | A1* | 4/2015 | Annapureddy | G01C 21/3688 |
| | | | | 701/430 |
| 2017/0124874 | A1* | 5/2017 | Cai | G08G 1/04 |
| 2017/0206471 | A1* | 7/2017 | Dermosessian | G06Q 20/42 |
| 2017/0206785 | A1* | 7/2017 | Kim | G06V 20/52 |
| 2018/0096263 | A1* | 4/2018 | Modi | G07B 15/00 |
| 2018/0157267 | A1* | 6/2018 | Gao | B62D 15/0295 |
| 2018/0170200 | A1* | 6/2018 | Brown | B60L 53/124 |
| 2018/0211539 | A1* | 7/2018 | Boss | G08G 1/168 |
| 2019/0043356 | A1* | 2/2019 | Subramanya | H04W 12/61 |
| 2019/0114855 | A1* | 4/2019 | Zhou | G07C 9/00182 |
| 2019/0197636 | A1* | 6/2019 | Mukundala | G08G 1/149 |
| 2020/0272950 | A1* | 8/2020 | Xu | G06Q 30/0185 |
| 2021/0348936 | A1* | 11/2021 | Kondo | G08G 1/143 |

FOREIGN PATENT DOCUMENTS

| | | | | |
|---|---|---|---|---|
| CN | 101916981 | A | * | 12/2010 |
| CN | 101937619 | A | * | 1/2011 |
| CN | 102881184 | A | * | 1/2013 |
| CN | 104376605 | A | * | 2/2015 | ............. G07B 15/06 |
| CN | 104763198 | A | * | 7/2015 | ............ E01F 13/042 |
| CN | 105098912 | A | | 11/2015 |
| CN | 105160933 | A | * | 12/2015 |
| CN | 205742011 | U | | 11/2016 |
| CN | 205810133 | U | * | 12/2016 |
| CN | 106355940 | A | | 1/2017 |
| CN | 107170272 | A | * | 9/2017 |
| CN | 107170288 | A | * | 9/2017 |
| CN | 107423832 | A | | 12/2017 |
| CN | 107620268 | A | * | 1/2018 | ......... E05B 65/0007 |
| CN | 105160933 | B | * | 3/2018 |
| CN | 108945100 | A | * | 12/2018 |
| CN | 209417938 | U | * | 9/2019 |
| CN | 112017309 | A | * | 12/2020 |
| JP | 2010-102497 | A | | 5/2010 |
| WO | WO-9708392 | A1 | * | 3/1997 | ............ E01F 13/085 |
| WO | WO-9728312 | A1 | * | 8/1997 | ............ E01F 13/065 |
| WO | WO-2009093589 | A1 | * | 7/2009 | ......... G01C 21/3682 |
| WO | WO-2011061028 | A1 | * | 5/2011 | ............... G08G 1/14 |
| WO | WO-2011162108 | A1 | * | 12/2011 | ............ B60K 26/021 |
| WO | WO-2014063561 | A1 | * | 5/2014 | ............ E01F 13/046 |
| WO | WO-2014207850 | A1 | * | 12/2014 | ......... B62D 15/0285 |
| WO | WO-2016067105 | A2 | * | 5/2016 | ............. G08G 1/017 |
| WO | WO-2018009038 | A1 | * | 1/2018 | ............ B62D 15/028 |
| WO | WO-2019132988 | A1 | * | 7/2019 | ......... G06F 16/90335 |
| WO | WO-2020024449 | A1 | * | 2/2020 | ............. G08G 1/142 |
| WO | WO-2021153136 | A1 | * | 8/2021 | ............. G06V 20/52 |
| WO | WO-2022024547 | A1 | * | 2/2022 | ............ B60W 30/06 |

OTHER PUBLICATIONS

Chinese-language Office Action issued in Chinese Application No. 201880076508.6 dated Feb. 10, 2022 with English translation (15 pages).

International Search Report (PCT/ISA/210) issued in PCT Application No. PCT/CN2018/072126 dated Oct. 12, 2018 (two (2) pages).

Written Opinion (PCT/ISA/237) issued in PCT Application No. PCT/CN2018/072126 dated Oct. 12, 2018 (four (4) pages).

* cited by examiner

PARKING SPACE LOCK AND SYSTEM AND METHOD FOR PROVIDING PARKING SERVICE

FIELD OF THE INVENTION

The present disclosure relates in general to a field of a parking service, and in particular, to a parking space lock, and a system, a method, and a non-transitory computer readable medium for providing a vehicle with a parking service.

BACKGROUND OF THE INVENTION

There is not a parking space lock, a system, or a method for providing a parking service to a vehicle, e.g., an autonomous vehicle or an unmanned vehicle, which makes a vehicle book a parking space, park into the parking space, and charge by itself.

SUMMARY OF THE INVENTION

An aspect of the present disclosure mainly aims to provide a parking space lock, as well as a system, a method, and a non-transitory computer readable medium for providing a vehicle with a parking service.

In accordance with a first exemplary embodiment of the present disclosure, a parking space lock is provided, comprising: a fixing portion fixed in a parking space; a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state; a first communication portion configured to communicate with a service device; a control portion configured to: when receiving a first signal from the service device by the first communication portion, control the movable portion to move to/to be at the first position and maintain the parking space lock in the locked state.

In an example of the present embodiment, the parking space lock may further comprise a second communication portion configured to communicate with a vehicle associated with the first signal, wherein the control portion may be further configured to: acquire a location of the vehicle; and when the location satisfies a condition, control the second communication portion to notify the vehicle of orientation and/or route information of the parking space.

In another example of the present embodiment, the parking space lock may further comprise a detecting portion configured to detect whether a vehicle is pulling into the parking space, wherein the control portion may be further configured to: when detecting a vehicle associated with the first signal is pulling into the parking space, control the movable portion to move to the second position and maintain the parking space lock in the open state.

In another example of the present embodiment, the parking space lock may further comprise an inductive charging portion, wherein the control portion may be further configured to: when detecting the vehicle is parked in the parking space, control the inductive charging portion to charge a battery in the vehicle.

In another example of the present embodiment, the parking space lock may further comprise a distance sensing portion, wherein the control portion is further configured to: when sensing an object within an unsafety range by the distance sensing portion, omit the first signal and notify the service device of the omission.

In another example of the present embodiment, the second communication portion may be further configured to communicate with the vehicle over LoRa network.

In another example of the present embodiment, the control portion may be further configured to: according to a second signal received by the second communication portion from the vehicle, control the movable portion and maintain the parking space lock.

In another example of the present embodiment, the service device may be structured to be a part of the parking space lock, wherein the service device is configured to: receive a reservation for the parking space from a vehicle; determine whether the reservation is valid; and if the reservation is valid: send the first signal to the first communication portion; and send identifying information about the parking space to the vehicle.

In accordance with a second exemplary embodiment of the present disclosure, a parking space lock is provided, comprising: a fixing portion fixed in a parking space; a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state; an identifying portion configured to identify a license number of a vehicle and determine whether the vehicle is registered based on the identified license number; a detecting portion configured to detect whether a vehicle is pulling into or leaving the parking space; and a control portion configured to: when detecting a vehicle is pulling into the parking space by the detecting portion and determining the vehicle is registered by the identifying portion, control the movable portion to move to/to be at the second position and maintain the parking space lock in the open state; and when detecting the vehicle is leaving the parking space by the detecting portion, control the movable portion to move to the first position and maintain the parking space lock in the locked state.

In an example of the present embodiment, the parking space lock may further comprise: a billing portion configured to start billing once detecting a vehicle is pulling into the parking space by the detecting portion, stop billing once detecting the vehicle is leaving the parking space by the detecting portion, and generate billing data; and a second communication portion configured to communicate with the vehicle, wherein the control portion is further configured to after detecting the vehicle is leaving the parking space by the detecting portion, control the second communication portion to send the billing data to the vehicle.

In another example of the present embodiment, the parking space lock may further comprise a status indicating portion configured to indicate whether the parking space is available visually.

In another example of the present embodiment, the parking space lock may further comprise a service device structured to be a part of the parking space lock, wherein: the service device is configured to: receive a reservation for the parking space from a vehicle; determine the reservation is valid if the parking space is available and the vehicle is registered; and send license number information of the vehicle to the identifying portion, the identifying portion is further configured to: determine whether a vehicle is the one corresponding to the reservation based on the identified license number and the license number information, and the control portion is further configured to: when detecting a vehicle is pulling into the parking space by the detecting portion and determining the vehicle is the one corresponding to the reservation by the identifying portion, control the movable portion to move to/to be at the second position and maintain the parking space lock in the open state.

In accordance with a third exemplary embodiment of the present disclosure, a system for providing a vehicle with a parking service is provided, comprising: at least one parking space lock above mentioned; and a service device configured to: receive a reservation for the parking space from a vehicle; determine whether the reservation is valid, and if the reservation is valid: send the first signal to the first communication portion; and send identifying information about the parking space to the vehicle.

In accordance with a fourth exemplary embodiment of the present disclosure, a system for providing a vehicle with a parking service is provided, comprising: at least one parking space lock above mentioned; and a service device, wherein: the parking space lock further comprises a first communication portion configured to communicate with the service device, the control portion is further configured to notify the service device whether the parking space is available via the first communication portion, the service device is configured to: receive a reservation for the parking space from a vehicle; determine the reservation is valid if the parking space is available and the vehicle is registered; and send license number information of the vehicle to the parking space lock via the first communication portion, and the identifying portion is further configured to: determine whether the vehicle is registered based on the identified license number and the license number information.

In accordance with a fifth exemplary embodiment of the present disclosure, a method for providing a vehicle with a parking service is provided, wherein the method may be implemented by a service device, comprising: receiving a reservation for a parking space from a vehicle, wherein a parking space lock is provided in the parking space; determining whether the reservation is valid, and if the reservation is valid: sending, by the service device, a first signal to the parking space lock so as to make the parking space lock maintain in a locked state; and sending identifying information about the parking space to the vehicle.

In accordance with an eighth exemplary embodiment of the present disclosure, a method for providing a vehicle with a parking service is provided, wherein the method may be implemented by a service device, comprising: receiving a reservation for a parking space from a vehicle, wherein a parking space lock is provided in the parking space; determining the reservation is valid if the parking space is available and the vehicle is registered; and sending license number information of the vehicle to the parking space lock.

In accordance with a sixth exemplary embodiment of the present disclosure, a method for providing a vehicle with a parking service is provided, wherein the method may be implemented by a parking space lock provided in a parking space, comprising: receiving a reservation for the parking space from a vehicle; determining whether the reservation is valid, and if the reservation is valid: maintaining in a locked state; and sending identifying information about the parking space to the vehicle.

In accordance with a seventh exemplary embodiment of the present disclosure, a method for providing a vehicle with a parking service is provided, wherein the method may be implemented by a parking space lock provided in a parking space, comprising: identifying a license number of a vehicle and determining whether the vehicle is registered based on the identified license number; detecting whether the vehicle is pulling into, parking in or leaving the parking space; maintaining in the open state, when the vehicle is pulling into or parking in the parking space and the vehicle is registered; and maintaining in the locked state after the vehicle is leaving the parking space.

In accordance with a ninth exemplary embodiment of the present disclosure, a system for providing a vehicle with a parking service is provided, comprising: one or more processors; and one or more memories configured to store a series of computer executable instructions, wherein the series of computer executable instructions, when executed by the one or more processors, cause the one or more processors to perform the above mentioned method.

In accordance with a tenth exemplary embodiment of the present disclosure, a non-transitory computer readable medium having instructions stored thereon that, when executed by one or more processors, causing the one or more processors to perform the steps of the above mentioned method is provided.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION OF THE PREFERRED EMBODIMENTS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like.

The term "A or B" used through the specification refers to "A and B" and "A or B" rather than meaning that A and B are exclusive, unless otherwise specified.

The term "parking space" used through the specification refers to a space that is able to accommodate a vehicle.

The term "parking lot" used through the specification refers to an area, either in an open air or in a building, for vehicles to park in, which may comprise one or more parking spaces.

Figure 1:
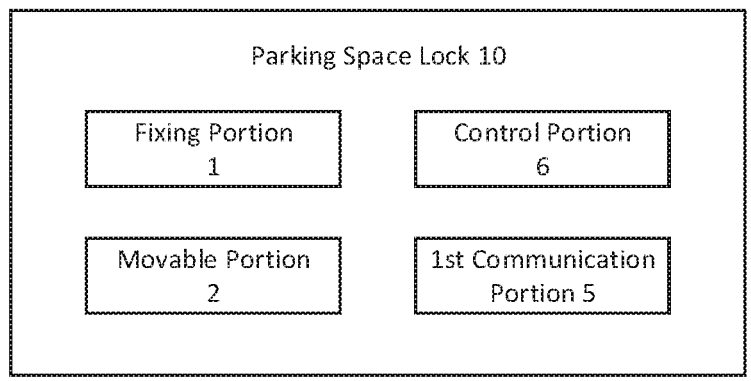
FIG. 1 illustrates a block diagram of a parking space lock in accordance with an exemplary embodiment of the present disclosure.

Referring first to FIG. 1, there is shown a block diagram of a parking space lock in accordance with an exemplary embodiment of the present disclosure. The parking space lock 10 may comprise at least: a fixing portion 1 that may be fixed in the parking space; a movable portion 2 that may be structured to be able to move between a first position and a second position with respect to the fixing portion 1; a first communication portion 5 that may be configured to communicate with a service device 20; and a control portion 6 that may be configured to control the parking space lock 10.

Figure 7:
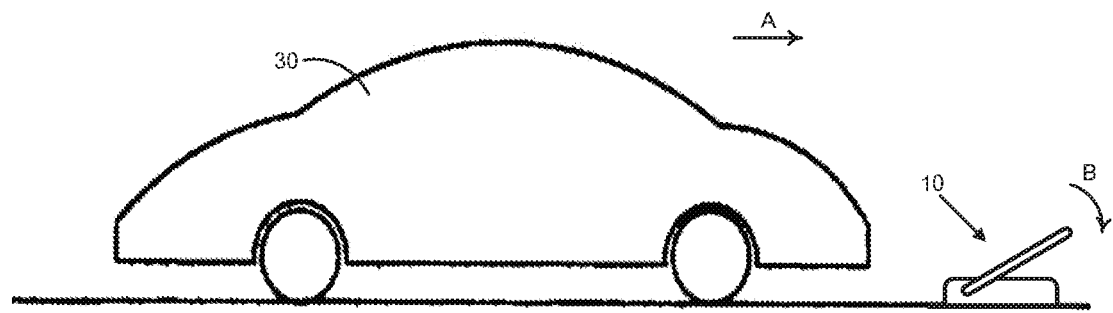
FIG. 7 schematically shows a state of a parking space lock in accordance with an exemplary embodiment of the present disclosure, when a vehicle is pulling into a parking space.
Figure 8:
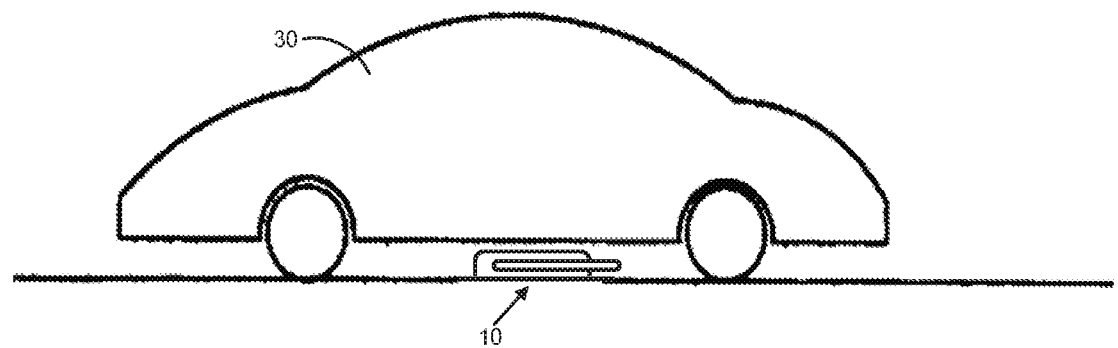
FIG. 8 schematically shows a state of a parking space lock in accordance with another exemplary embodiment of the present disclosure, when a vehicle is parked in a parking space.

In some embodiments, the fixing portion 1 may be fixed on a floor of the parking space as shown in FIGS. 7 and 8. Although not shown, the fixing portion 1 may be fixed on a ceiling or a wall of the parking space.

Figure 5:
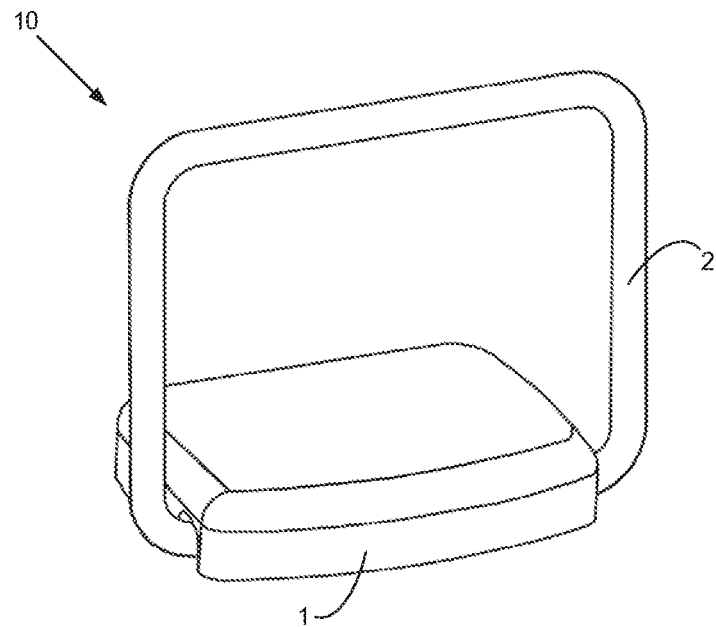
FIG. 5 schematically shows a parking space lock in accordance with an exemplary embodiment of the present disclosure, wherein the parking space lock is in a locked state.

When the movable portion 2 moves with respect to the fixing portion 1 to the first position, e.g., a position corresponding to the movable portion 2 standing up, the parking space lock 10 changes to the locked state as shown in FIG. 5. When the parking space lock 10 is in the locked state, the parking space lock 10, especially the movable portion 2, may block a vehicle which is attempting to park so as to restrain it from parking into the parking space. That is to say, no vehicle is allowed to enter the parking space when the parking space lock 10 is in the locked state.

Figure 6:
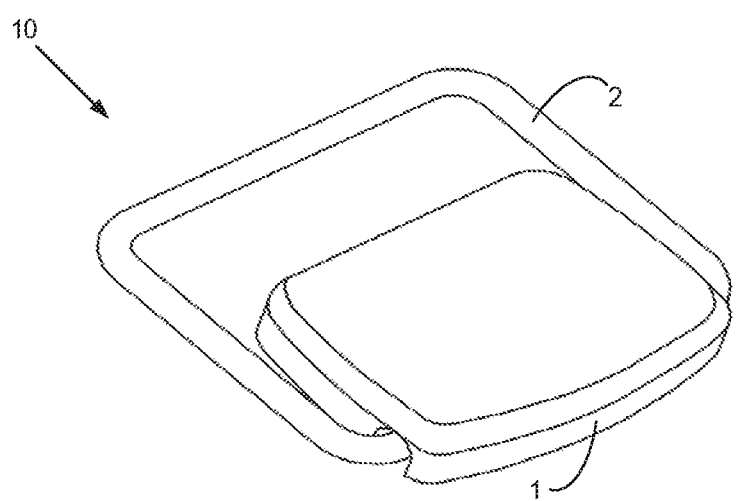
FIG. 6 schematically shows a parking space lock in accordance with another exemplary embodiment of the present disclosure, wherein the parking space lock is in an open state.

When the movable portion 2 moves with respect to the fixing portion 1 to the second position, e.g., a position corresponding to the movable portion 2 laying down, the parking space lock 10 changes to the open state as shown in FIG. 6. When the parking space lock 10 is in the open state, the parking space lock 10, especially the movable portion 2, may not block any vehicle which is attempting to park into the parking space. That is to say, any vehicle is allowed to enter the parking space when the parking space lock 10 is in the open state.

In some embodiments, the movable portion 2 may rotate with respect to the fixing portion 1 between the first position and the second position, as shown in FIGS. 5-8. Although not shown, the movable portion 2 may be structured to move in some other manner, e.g., the movable portion 2 may be lifted up and pressed down with respect to the fixing portion 1.

The service device 20 may be a server for providing parking service, an electronic device (e.g., a smart phone or an in-vehicle device) of a user (e.g., a person or a vehicle, especially an autonomous vehicle), or a platform. The platform may include at least one server and at least one application operated thereon. The service device 20 and the user may both connect to the platform via the network, thus the service device 20 may send data to and receive data from the user.

The control portion 6 may be configured to control the parking space lock 10. In some embodiments, when receiving a first signal from the service device 20 by the first communication portion 5, the control portion 6 may control the movable portion 2 to move to the first position (if the movable portion 2 is at another position) or to be at the first position (if the movable portion 2 is at the first position), and maintain the parking space lock 10 in the locked state so as to prevent any vehicle from parking into the parking space.

Figure 2:
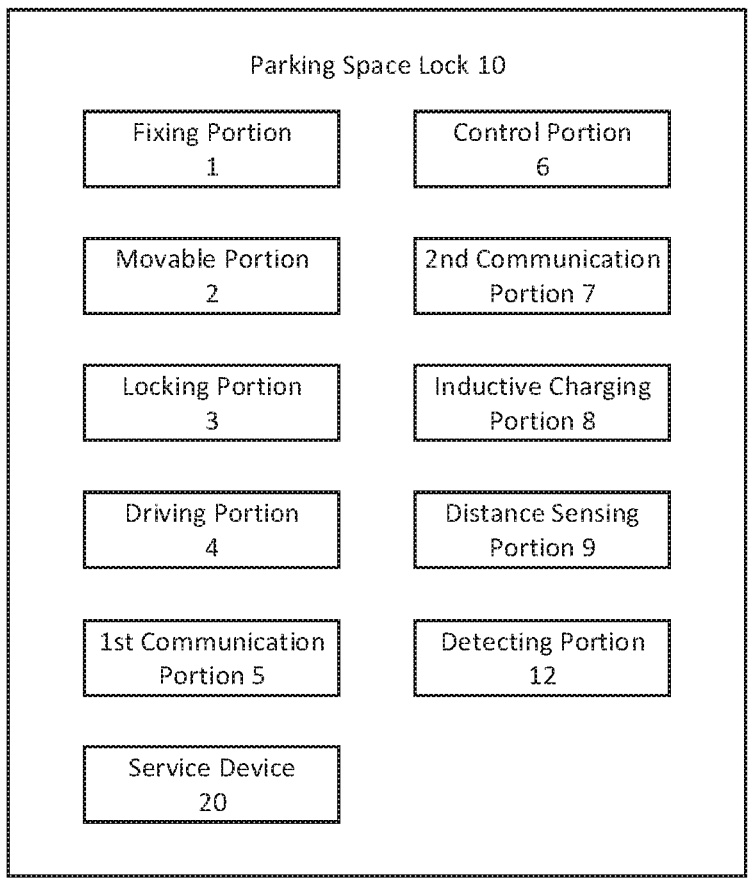
FIG. 2 illustrates a block diagram of a parking space lock in accordance with another exemplary embodiment of the present disclosure.

Referring first to FIG. 2, there is shown a block diagram of a parking space lock in accordance with another exemplary embodiment of the present disclosure. The parking space lock 10 may further comprise: a locking portion 3 that may be structured to be able to lock the movable portion 2 at the first position or at the second position; a driving portion 4 that may be structured to be able to drive the movable portion 2 to move; a second communication portion 7 configured to communicate with a vehicle 30 via a network (not shown); an inductive charging portion 8; a distance sensing portion 9; or a detecting portion 12.

The locking portion 3 may be structured to be able to lock the movable portion 2 at the first position or at the second position. If the locking portion 3 locks the movable portion 2 at the first position, the parking space lock is maintained in the locked state. And if the locking portion 3 locks the movable portion 2 at the second position, the parking space lock is maintained in the open state.

The first communication portion 5 may communicate with the service device 20 via a network (not shown). The network may include a Long range (LoRa) network, a local area network (LAN), a wide area network (WAN) (e.g., the Internet), a virtual network, a telecommunications network, and/or other interconnected paths across which multiple entities may communicate. In some embodiments, the network includes Bluetooth® communication networks or a cellular communications network for sending and receiving data via e.g. short messaging service (SMS), multimedia messaging service (MMS), hypertext transfer protocol (HTTP), direct data connection, WAP, e-mail, etc. In other embodiments, the network may be a mobile data network such as CDMA, GPRS, TDMA, GSM, WiMax, 3G, 4G, LTE, VoLTE, or any other mobile data network or combination of mobile data networks.

In some embodiments, the control portion 6 may be configured to control the movable portion 2 to move by controlling the driving portion 4 and maintain the parking space lock 10 by controlling the locking portion 3. In some embodiments, when receiving a first signal from the service device 20 by the first communication portion 5, the control portion 6 may control the driving portion 4 to drive the movable portion 2 to move to the first position and control the locking portion 3 to lock the movable portion 2 at the first position so as to maintain the parking space lock 10 in the locked state.

The second communication portion 7 may be configured to communicate with a vehicle 30 (e.g., an autonomous vehicle) via a network (not shown). The vehicle 30 may be the one associated with the first signal, i.e., the vehicle which has made a reservation for the parking space. Please note that, the second communication portion 7 may communicate in a variety of manners over a Long range (LoRa) network) just as the first communication portion 5 discussed above, and thus their details are omitted here.

The control portion 6 may be further configured to control the second communication portion 7 to establish a communication connection with the vehicle 30 after receiving the first signal by the first communication portion 5. Accordingly, the second communication portion 7 may send data to and receive data from the vehicle 30. Furthermore, in some embodiments, the control portion 6 may be further configured to control the parking space lock 10 according to a second signal received by the second communication portion 7 from the vehicle 30. For example, the vehicle 30 may send the second signal to the second communication portion 7 so as to make the control portion 6 control the movable portion 2 to move to the second position then control the locking portion 3 to lock the movable portion 2 at the second position to change the parking space lock 10 into the locked state and maintain the parking space lock 10 in the locked state. In another example, the vehicle 30 may send the second signal to the second communication portion 7 so as to make the parking space lock 10 charge a battery in the vehicle 30 by electromagnetic induction.

In some embodiments, the control portion 6 may be further configured to acquire a location of the vehicle 30; and when the location satisfies a condition, control the second communication portion 7 to notify the vehicle 30 of orientation and/or route information of the parking space, for example, an orientation of the parking space lock 10 with respect to the vehicle 30, and/or a route to the parking space lock 10 from the location of the vehicle 30.

The control portion 6 may acquire the location of the vehicle 30 from the service device 20 via the first communication portion 5 or from the vehicle 30 via the second communication portion 7.

In some embodiments, the location of the vehicle 30 satisfying the condition may be the distance between the vehicle 30 and the parking space lock 10 is less than a threshold. In general, when close to a target, the location information (e.g., GPS positioning data) may be always not enough for finding the target. Thus, more information may be needed in this situation.

In some embodiments, the location of the vehicle 30 satisfying the condition may be the vehicle 30 is in the same building or the same parking lot with the parking space lock 10. In general, when entering a building or a parking lot, it may be hard to find the right parking space and the location information (e.g., GPS positioning data) may not offer any help. Thus, more information may be needed in this situation.

The orientation information may refer to the information that is able to indicate the orientation of the parking space lock 10 with respect to the vehicle 30. For example, the orientation information may indicate that the parking space lock 10 is in the direction of east 30° by south relative to the vehicle 30.

The route information may refer to the information that is able to indicate at least one route that is able to navigate the vehicle 30 to the parking space lock 10. A route inside a building or a parking lot is more preferred.

The orientation and/or route information may help the vehicle 30 with finding the parking space (i.e., the parking space lock 10) more easily.

In some embodiments, the parking space lock 10 may further comprise a detecting portion 12. The detecting portion 12 may be configured to detect whether a vehicle is pulling into the parking space. For example, the detecting portion 12 may comprise a distance sensor for sensing the distance between the vehicle and the distance sensor and sensing distance variations; and a detecting unit for detecting whether a vehicle is pulling into the parking space based on the sensed distance and distance variations. For example, when the distance is getting shorter and/or the distance become shorter than a threshold, the detecting portion 12 may detect the vehicle is pulling into the parking space.

In some embodiments, as shown in FIG. 7, when detecting the vehicle 30 is pulling into the parking space, e.g., when detecting the driving direction of the vehicle 30 is direction A, the control portion 6 may be further configured to control the driving portion 4 to drive the movable portion 2 to move to the second position (i.e., to move in the direction of B) then control the locking portion 3 to lock the movable portion 2 at the second position to change the parking space lock 10 into and maintain the parking space lock 10 in the open state.

If any other vehicle (i.e., not the vehicle 30) is pulling into the parking space, the control portion 6 may identify that the vehicle is not vehicle 30, then the control portion 6 may not control the movable portion 2 to move to the second position, so that the parking space lock 10 holds the locked state to prevent the vehicle from parking into the parking space.

As shown in FIG. 8, when the vehicle 30 is parked in the parking space, the parking space lock 10 is maintained in the open state.

In some embodiments, the parking space lock 10 may further comprise an inductive charging portion 8, the control portion 6 may be further configured to when detecting the vehicle 30 is parked in the parking space, control the inductive charging portion 8 to charge a battery in the vehicle 30. For example, the vehicle 30 may initiate the charging process by sending a charging request to the second communication portion 7. After receiving the charging request, the control portion 6 may detect whether the vehicle 30 is parked in the parking space, e.g. by a distance sensor. If detecting the vehicle 30 is parked in the parking space, the control portion 6 may control the inductive charging portion 8 to charge a battery in the vehicle 30. In another example, the parking space lock 10 may initiate the charging process. If detecting the vehicle 30 is parked in the parking space, the control portion 6 may send a charging inquiry to the vehicle 30 via the second communication portion 7. If the signal from the vehicle 30 indicates charging is needed, the control portion 6 may control the inductive charging portion 8 to charge a battery in the vehicle 30.

In some embodiments, the parking space lock 10 may further comprise a distance sensing portion 9 (e.g., an infrared sensor, an ultrasonic sensor, a microwave sensor, a photoelectric sensor, and the like), the control portion 6 may be further configured to when sensing an object within an unsafety range of the parking space lock 10 by the distance sensing portion 9, omit the first signal and notify the service device 20 of the omission. The unsafety range of the parking space lock 10 may refer to a range around of the parking space lock 10, an object in which may be in danger of being hit by the movable portion 2. For example, if there is a vehicle parked, a person situated, a subject provided in the parking space and so on, the distance sensing portion 9 may sense an object within an unsafety range of the parking space lock 10. In this situation, when the parking space lock 10 receives the first signal from the service device 20, the control portion 6 may omit the first signal, i.e., the control portion 6 may not control the parking space lock 10 change to the locked state to avoid scratch and damage.

In some embodiments, the service device 20 mentioned above may be integrated in or be a part of the parking space lock 10 as shown in FIG. 2, the service device 20 may be configured to: receive a reservation for the parking space from the vehicle 30; determine whether the reservation is valid, and if the reservation is valid: send the first signal to the first communication portion 5; and send identifying information about the parking space to the vehicle 30.

If receiving a reservation from the vehicle 30, the service device 20 may determine whether the reservation is valid. For example, whether the vehicle 30 made the reservation is a registered user (i.e., a user who is allowed to use the parking space), whether the reservation aims at the parking space which the parking space lock 10 is mounted in, and/or whether the parking space is available (e.g., not reserved, unoccupied, no malfunction, not in maintenance and so on). If the vehicle 30 is a registered user, the reservation aims at the parking space, and/or the parking space is available, the service device 20 may determine the reservation is valid.

If the reservation is valid, the service device 20 may send the first signal to the first communication portion 5 to maintain the parking space lock 10 in the locked state to prevent a vehicle, except for the vehicle 30, from parking into the parking space.

If the parking space lock 10 receives the first signal from the service device 20, but sensing an object within an unsafety range of the parking space lock 10 by the distance sensing portion 9, the control portion 6 may omit the first signal and notify the service device 20 of the omission. The service device 20, after receiving the notification, may determine the parking space is currently unavailable, and may further determine the reservation is invalid.

At the same time of or before/after sending the first signal to the first communication portion 5, the service device 20 may send identifying information about the parking space to the vehicle 30 to assist the vehicle 30 to find the parking space. For example, the identifying information may comprise one or more of location information, floor information, and visual information of the parking space.

The location information may include at least one of GPS positioning data, information of latitude and longitude, building number and street name and so on. The floor information may indicate the parking space is on which floor. The visual information may indicate the visual presentation (e.g., shape, color, identifier and so on) of the parking space and/or the parking space lock 10.

Figure 3:
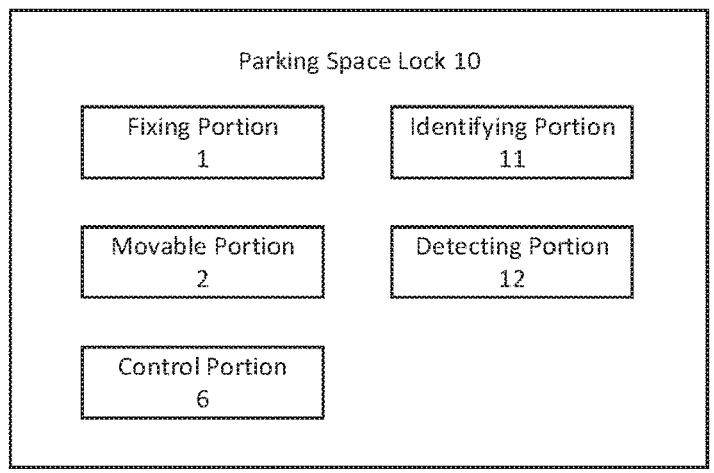
FIG. 3 illustrates a block diagram of a parking space lock in accordance with another exemplary embodiment of the present disclosure.

Referring to FIG. 3, there is shown a block diagram of a parking space lock in accordance with another exemplary embodiment of the present disclosure. The parking space lock 10 may comprise at least: a fixing portion 1 that may be fixed in the parking space; a movable portion 2 that may be structured to be able to move between a first position and a second position with respect to the fixing portion 1; an identifying portion 11 that may be configured to identify a license number of a vehicle and determine whether the vehicle is registered based on the identified license number; a detecting portion 12 configured to detect whether a vehicle is pulling into or leaving the parking space; and a control portion 6 that may be configured to control the parking space lock 10.

The fixing portion 1 and the movable portion 2 are similar to the same in FIG. 1 discussed above respectively, and thus their details are omitted here.

The identifying portion 11 may be configured to identify a license number of a vehicle and determine whether the vehicle is registered based on the identified license number. For example, the identifying portion 11 may comprise a camera for capturing one or more pictures and/or videos for the region of the vehicle plate; an identifying unit for processing the captured pictures and/or videos to identify the license number of the vehicle; and a storage unit that stores a database of license numbers for all the registered vehicles. Thus, the identifying portion 11 may search the identified license number in the database and determine whether the vehicle is registered based on the identified license number.

The detecting portion 12 may be configured to detect whether a vehicle is pulling into or leaving the parking space. For example, the detecting portion 12 may comprise a distance sensor for sensing the distance between the vehicle and the distance sensor and sensing distance variations; and a detecting unit for detecting whether a vehicle is pulling into or leaving the parking space based on the sensed distance and distance variations. For example, when the distance is getting longer and/or the distance become greater than a threshold, the detecting portion 12 may detect the vehicle is leaving the parking space. Otherwise, the detecting portion 12 may detect the vehicle is pulling into the parking space.

The control portion 6 may be configured to: when detecting a vehicle is pulling into the parking space by the detecting portion 12 and determining the vehicle is registered by the identifying portion 11, control the movable portion 2 to move to the second position (if the movable portion 2 is at another position) or to be at the second position (if the movable portion 2 is at the second position), and maintain the parking space lock 10 in the open state; and when detecting the vehicle is leaving the parking space by the detecting portion 12, control the movable portion 2 to move to the first position and maintain the parking space lock 10 in the locked state. Therefore, a registered vehicle may pull into a parking space without any manual operation.

Figure 4:
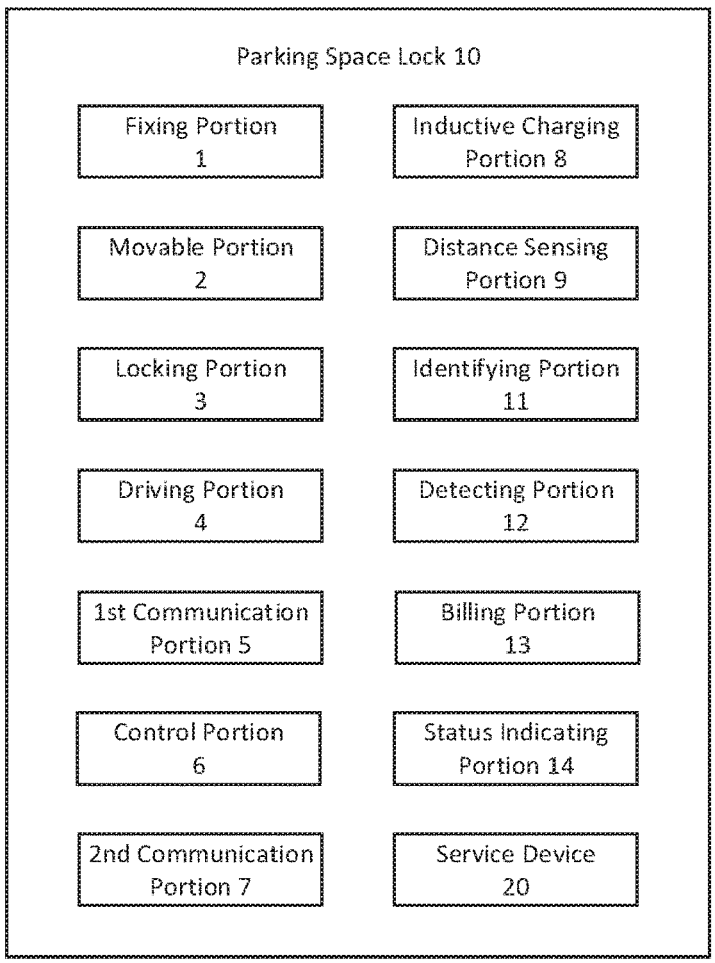
FIG. 4 illustrates a block diagram of a parking space lock in accordance with another exemplary embodiment of the present disclosure.

Referring first to FIG. 4, there is shown a block diagram of a parking space lock in accordance with another exemplary embodiment of the present disclosure. The parking space lock 10 may further comprise: a service device 20; a locking portion 3 that may be structured to be able to lock the movable portion 2 at the first position or at the second position; a driving portion 4 that may be structured to be able to drive the movable portion 2 to move; a first communication portion 5 that may be configured to communicate with the service device 20; a second communication portion 7 configured to communicate with a vehicle 30 via a network (not shown); an inductive charging portion 8; a distance sensing portion 9; an billing portion 13; or a status indicating portion 14.

The locking portion 3, the driving portion 4, the first communication portion 5, the second communication portion 7, the inductive charging portion 8, and the distance sensing portion 9 are similar to the same in FIG. 2 discussed above respectively, and thus their details are omitted here.

The billing portion 13 may be used for charging a parking service fee. The billing portion 13 may be configured to start billing once detecting the vehicle 30 is pulling into the parking space by the detecting portion 12, stop billing once detecting the vehicle 30 is leaving the parking space by the detecting portion 12, and generate billing data. For example, the detecting portion 12 may detect that the vehicle 30 pull into the parking space at 5:05 pm and leave the parking space at 7:40 pm. The billing portion 13 may start billing at 5:05 pm and stop at 7:40 pm. The billing data may comprise a total parking fee generated according to a unit parking fee and a parking duration, e.g., 2 hours and 35 minutes from 5:05 pm to 7:40 pm. The billing data may further comprise the unit parking fee and the parking duration.

The control portion 6 may be further configured to after detecting the vehicle is leaving the parking space by the detecting portion 12, control the second communication portion 7 to send the billing data to the vehicle 30. The vehicle 30 may pay a fee according to the billing data.

The status indicating portion 14 may be configured to indicate whether the parking space is available visually. For example, the status indicating portion 14 may be a LED light. In some embodiments, the LED light may be turned on to indicate the parking space is unavailable (e.g., reserved, broken, and so on) and may be turned off to indicate the parking space is available (e.g., not reserved, unoccupied, no malfunction, not in maintenance and so on). In some embodiments, the LED light may display a first color to indicate the parking space is not available and display a second color to indicate the parking space is available. When the LED light indicate the parking space is available, any registered vehicle may park into the parking space without any reservation.

The service device 20 may be a server for providing parking service, an electronic device (e.g., a smart phone or an in-vehicle device) of a user (e.g., a person or a vehicle, especially an autonomous vehicle), or a platform. The platform may include at least one server and at least one application operated thereon. The service device 20 and the user may both connect to the platform via the network, thus the service device 20 may send data to and receive data from the user.

In some embodiments, the service device 20 mentioned above may be integrated in or be a part of the parking space lock 10 as shown in FIG. 4. The service device 20 may be configured to: receive a reservation for the parking space from the vehicle 30; determine whether the reservation is valid if the parking space is available and the vehicle 30 is registered; and send license number information of the vehicle 30 to the identifying portion 11. The license number information may include the license number of the vehicle 30, so that the identifying portion 11 may determine whether the vehicle 30 is the one corresponding to the reservation based on the identified license number and the license number information. For example, if the identified license number is identical with the license number of the vehicle 30 included within the license number information, the identifying portion 11 may determine that the vehicle 30 is the one corresponding to the reservation. In this case, the control portion 6 may be further configured to: when detecting a vehicle is pulling into the parking space by the detecting portion 12 and determining the vehicle is the one corresponding to the reservation by the identifying portion 11, control the movable portion 2 to move to the second position (if the movable portion 2 is at another position) or to be at the second position (if the movable portion 2 is at the second position), and maintain the parking space lock 10 in the open state.

Figure 9:
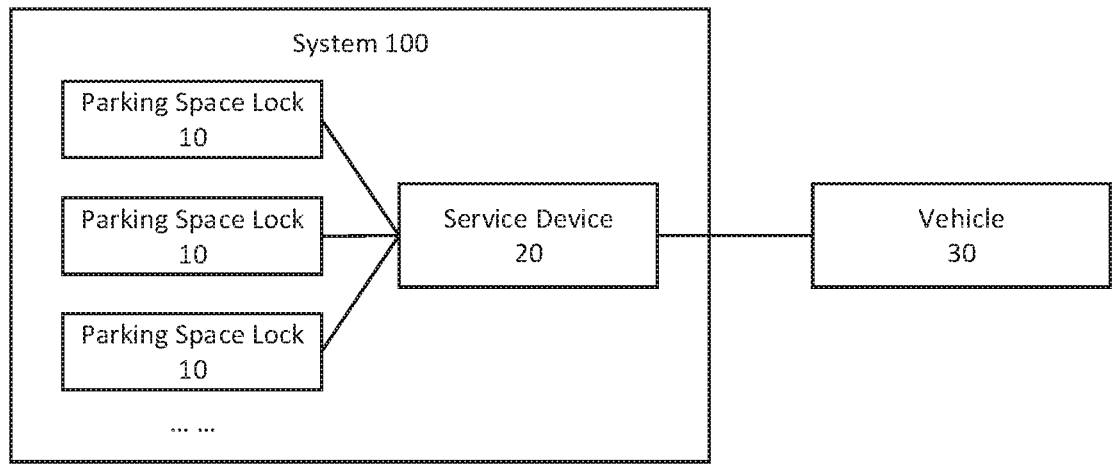
FIG. 9 illustrates a block diagram of a system for providing a vehicle with parking service in accordance with an exemplary embodiment of the present disclosure.

Referring to FIG. 9, there is shown a block diagram of a system for providing a vehicle with parking service in accordance with an exemplary embodiment of the present disclosure. A system 100 for providing a vehicle 30 with a parking service may comprise: at least one parking space lock 10 described above; and a service device 20.

In some embodiments, the service device 20 may be configured to: receive a reservation for the parking space from the vehicle 30; determine whether the reservation is valid; and if the reservation is valid: send the first signal to the first communication portion 5; and send identifying information about the parking space to the vehicle 30.

In some embodiments, the service device 20 may be configured to: receive a reservation for the parking space from a vehicle 30; determine the reservation is valid if the parking space is available and the vehicle 30 is registered; and send license number information of the vehicle 30 to the parking space lock 10.

In the case shown in FIG. 9, the service device 20 is provided separated from the parking space lock 10. As mentioned above, the service device 20 may be a server, an electronic device, or a platform. In the system 100, the service device 20 may communicate with the at least one parking space lock 10. If the system 100 is based on one or more parking lots and each of the parking lot has one or more parking spaces, the service device 20 may communicate with each parking space lock 10 mounted respectively in each parking space.

If receiving a reservation from the vehicle 30, the service device 20 may determine whether the reservation is valid. For example, the service device 20 may determine whether the vehicle 30 made the reservation is a registered user (i.e., a user who is allowed to use the parking space), and/or determine whether there is an available parking space (e.g., a parking space unoccupied, a parking space not in maintenance and so on). If the vehicle 30 is a registered user and/or there is an available parking space, the service device 20 may determine the reservation is valid.

In some embodiments, the reservation made by the vehicle 30 may specify a certain parking space. In this case, the service device 20 may determine whether the vehicle 30 made the reservation is a registered user (i.e., a user who is allowed to use the parking space), and/or whether the certain parking space is available (e.g., unoccupied, not in maintenance and so on). If the vehicle 30 is a registered user and/or the certain parking space is available, the service device 20 may determine the reservation is valid.

In some embodiments, if the reservation is valid, the service device 20 may send the first signal to the first communication portion 5 to maintain the parking space lock 10 in the locked state to prevent a vehicle, except for the vehicle 30, from parking into the parking space.

If the parking space lock 10 receives the first signal from the service device 20, but sensing an object within an unsafety range of the parking space lock 10 by the distance sensing portion 9, the control portion 6 may omit the first signal and notify the service device 20 of the omission. In some embodiment, after receiving the notification, the service device 20 may find another available parking space in the system 100 for the vehicle 30 in the case of the reservation not specifying a certain parking space, and may send a first signal to another available parking space. In some embodiment, after receiving the notification, the service device 20 may determine the certain parking space is currently unavailable in the case of the reservation specifying a certain parking space, and may further determine the reservation is invalid.

At the same time of or before/after sending the first signal to the first communication portion 5, the service device 20 may send identifying information about the booked parking space to the vehicle 30 to assist the vehicle 30 to find the parking space. For example, the identifying information may comprise one or more of location information, floor information, and visual information of the parking space.

In some embodiments, if the reservation is valid, the service device 20 may send license number information of the vehicle 30 to the parking space lock 10. The parking space lock 10 may determine whether a vehicle is the one corresponding to the reservation based on the identified license number by the parking space lock 10 and the license number information; and control the movable portion 2 to move to the second position (if the movable portion 2 is at another position) or to be at the second position (if the movable portion 2 is at the second position), and maintain the parking space lock 10 in the open state when detecting the vehicle 30 is pulling into the parking space.

Figure 10:
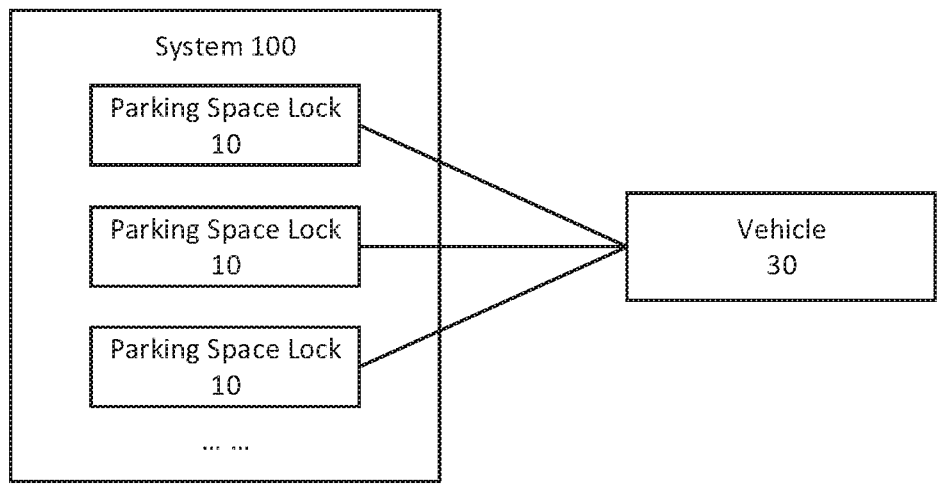
FIG. 10 illustrates a block diagram of a system for providing a vehicle with parking service in accordance with another exemplary embodiment of the present disclosure.

Referring to FIG. 10, there is shown a block diagram of a system for providing a vehicle with parking service in accordance with another exemplary embodiment of the present disclosure. A system 100 for providing a vehicle 30 with a parking service may comprise: at least one parking space lock 10 described above, wherein the parking space lock 10 may further comprise the service device (not shown) described above. In the case shown in FIG. 10, the service device functions just as the service device 20 discussed above, and thus their details are omitted here.

Figure 11:
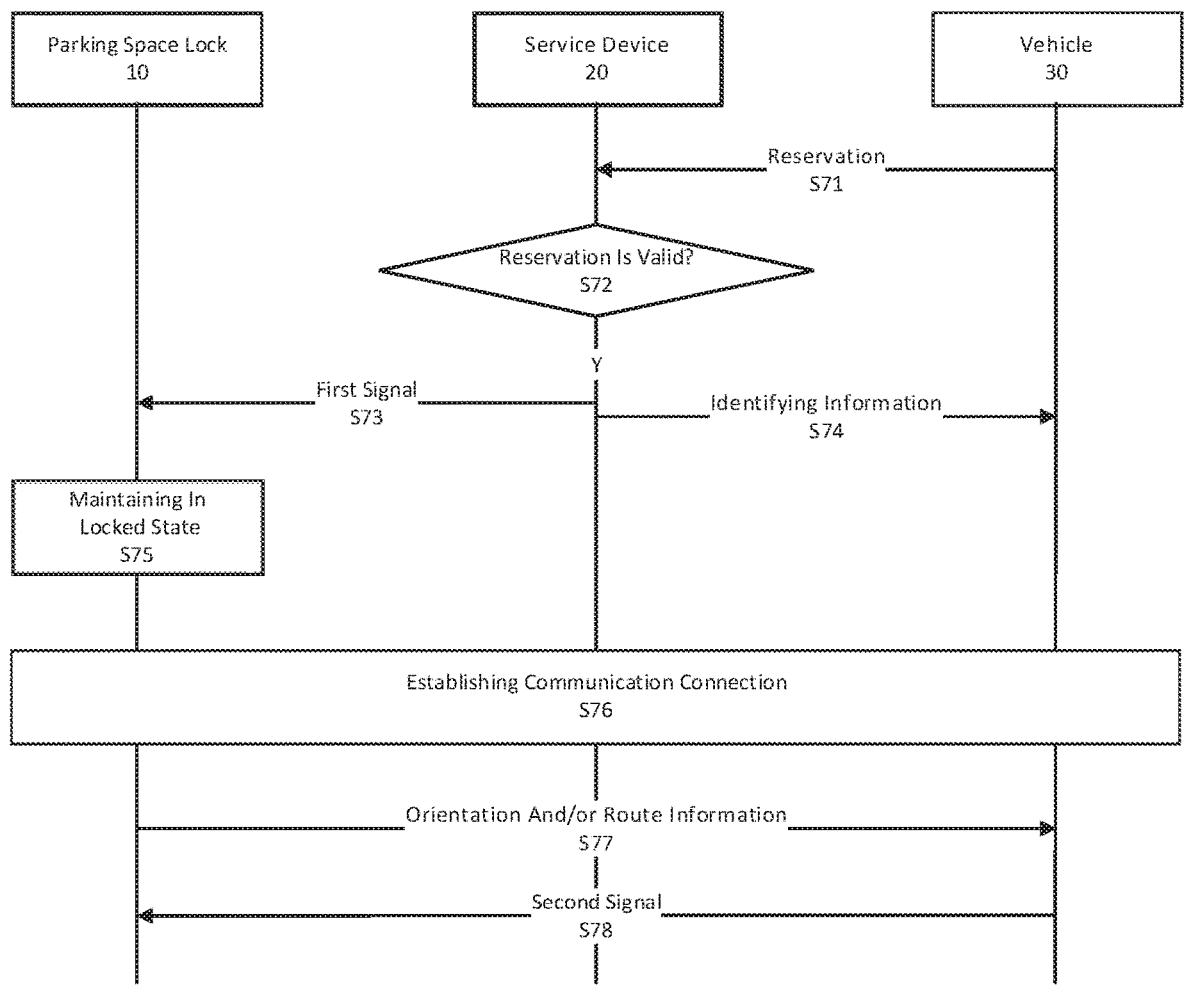
FIG. 11 illustrates a flow chart with information transferred showing a method for providing a vehicle with parking service in accordance with an exemplary embodiment of the present disclosure.

Referring to FIG. 11, there is shown a flow chart with information transferred showing a method for providing a vehicle with parking service in accordance with an exemplary embodiment of the present disclosure. The method may be performed by the system described above. The steps of the method presented below are intended to be illustrative. In some embodiments, the method may be accomplished with one or more additional steps not described, and/or without one or more of the steps discussed. Additionally, the order in which the steps of the method are illustrated in the figure and described as below is not intended to be limiting. In some embodiments, the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more modules executing some or all of steps of the method in response to instructions stored electronically on an electronic storage medium. The one or more processing modules may include one or more devices configured through hardware, firmware, and/or software to be specifically designed for execution of one or more of steps of the method.

As shown in FIG. 11, a vehicle 30 may send S71 a reservation to a service device 20 of a system to book a parking space. The reservation may specify or not specify a certain parking space. The service device 20 may determine S72 whether the reservation is valid. If the reservation is determined to be valid (i.e., Y), the service device 20 may send S73 a first signal to a parking space lock 10 provided in an available parking space or the certain parking space specified by the vehicle 30. At the same time of or before/after sending the first signal, the service device 20 may send S74 identifying information about the parking space to the vehicle 30. When receiving the first signal from the service device 20, the parking space lock 10 may be maintained S75 the locked state. After receiving the first signal from the service device 20, the parking space lock 10 may establish S76 a communication connection with the vehicle 30, e.g., via LoRa network. Thus, the parking space lock 10 and the vehicle 30 may communicate with each other directly without via the service device 20. For example, when the location of the vehicle 30 satisfies a condition, the parking space lock 10 may notify S77 the vehicle 30 of orientation and/or route information of the parking space lock 10 with respect to the vehicle 30. In another example, the vehicle 30 may send S78 a second signal to the parking space lock 10, and the parking space lock 10 may change its state or perform other operations according to the second signal received from the vehicle 30.

Figure 12:
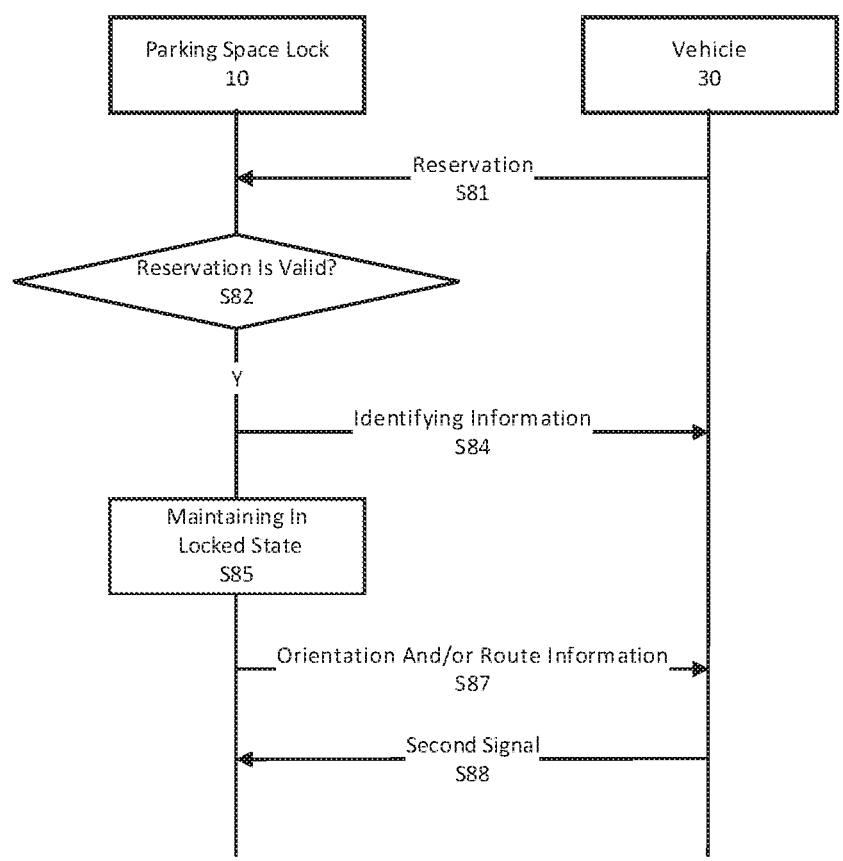
FIG. 12 illustrates a flow chart with information transferred showing a method for providing a vehicle with parking service in accordance with another exemplary embodiment of the present disclosure.

Referring to FIG. 12, there is shown a flow chart with information transferred showing a method for providing a vehicle with parking service in accordance with another exemplary embodiment of the present disclosure. The method may be performed by the system described above. The steps of the method presented below are intended to be illustrative. In some embodiments, the method may be accomplished with one or more additional steps not described, and/or without one or more of the steps discussed. Additionally, the order in which the steps of the method are illustrated in the figure and described as below is not intended to be limiting. In some embodiments, the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more modules executing some or all of steps of the method in response to instructions stored electronically on an electronic storage medium. The one or more processing modules may include one or more devices configured through hardware, firmware, and/or software to be specifically designed for execution of one or more of steps of the method.

As shown in FIG. 12, a vehicle 30 may send S81, e.g., via LoRa network, a reservation to a parking space lock 10 in a system to book the parking space in which the parking space lock 10 is mounted. The parking space lock 10 may determine S82 whether the reservation is valid. If the reservation is determined to be valid (i.e., Y), the parking space lock 10 may send S84 identifying information about the parking space to the vehicle 30 and may be maintained S85 the locked state. For example, when the location of the vehicle 30 satisfies a condition, the parking space lock 10 may notify S87 the vehicle 30 of orientation and/or route information of the parking space lock 10 with respect to the vehicle 30. In another example, the vehicle 30 may send S88 a second signal to the parking space lock 10, and the parking space lock 10 may change its state or perform other operations according to the second signal received from the vehicle 30.

Figure 13:
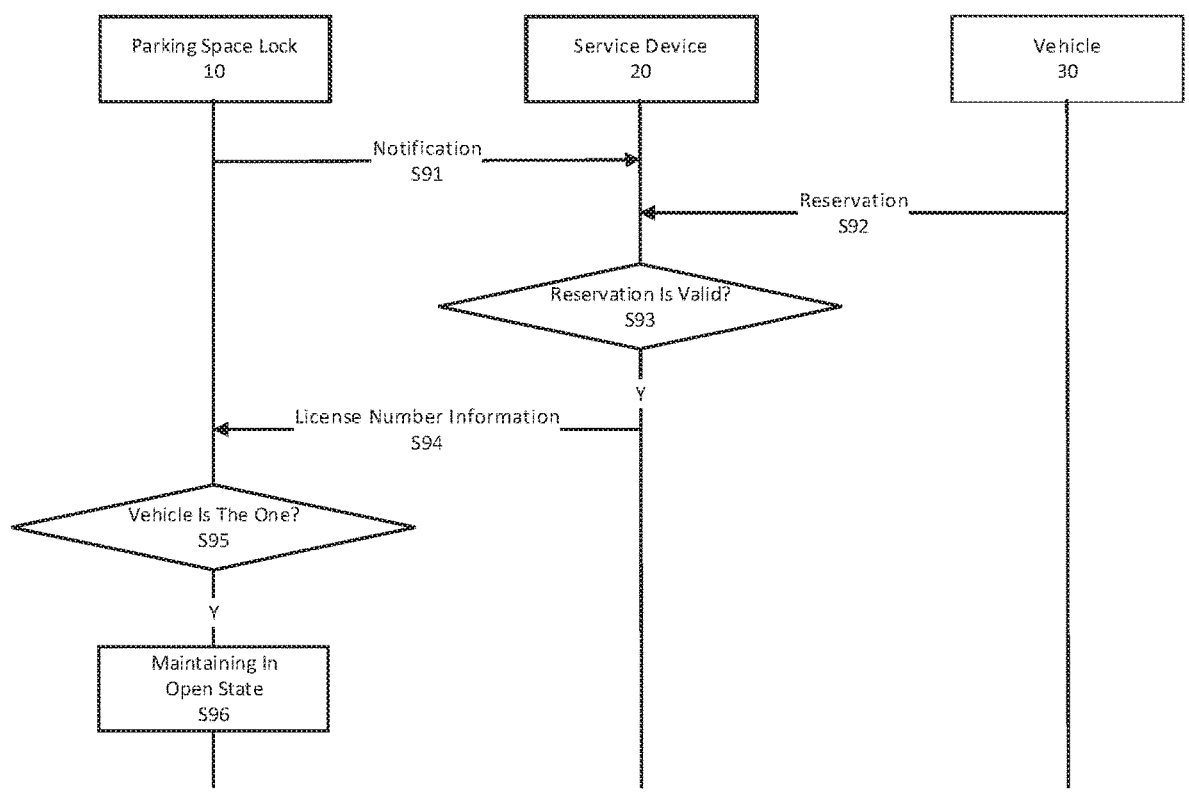
FIG. 13 illustrates a flow chart with information transferred showing a method for providing a vehicle with parking service in accordance with another exemplary embodiment of the present disclosure.

Referring to FIG. 13, there is shown a flow chart with information transferred showing a method for providing a vehicle with parking service in accordance with another exemplary embodiment of the present disclosure. The method may be performed by the system described above. The steps of the method presented below are intended to be illustrative. In some embodiments, the method may be accomplished with one or more additional steps not described, and/or without one or more of the steps discussed.

Additionally, the order in which the steps of the method are illustrated in the figure and described as below is not intended to be limiting. In some embodiments, the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more modules executing some or all of steps of the method in response to instructions stored electronically on an electronic storage medium. The one or more processing modules may include one or more devices configured through hardware, firmware, and/or software to be specifically designed for execution of one or more of steps of the method.

As shown in FIG. 13, a parking space lock 10 may notify S91 a service device 20 whether the parking space is available (e.g., unoccupied, no malfunction, not in maintenance and so on), A vehicle 30 may send S92 a reservation to the service device 20 of a system to book a parking space. The reservation may specify or not specify a certain parking space. The service device 20 may determine S93 whether the reservation is valid. If the reservation is determined to be valid (i.e., Y), the service device 20 may send S94 license number information of the vehicle 30 to the parking space lock 10. The parking space lock 10 may determine S95 whether the vehicle 30 is the one corresponding to the reservation based on the identified license number and the license number information. If the vehicle 30 is determined to be the one corresponding to the reservation (i.e., Y), the parking space lock 10 may change to and maintain S96 in the open state when the vehicle 30 is pulling into and parking in the parking space. At that time, the parking space is not available. The parking space lock 10 may notify the service device 20 that the parking space is not available, or the service device 20 may know that by itself without any notification from the parking space lock 10. When the vehicle 30 leaves the parking space, the parking space lock 10 may change to and maintain in the locked state (not shown), and may notify the service device 20 that the parking space is available again.

Figure 14:
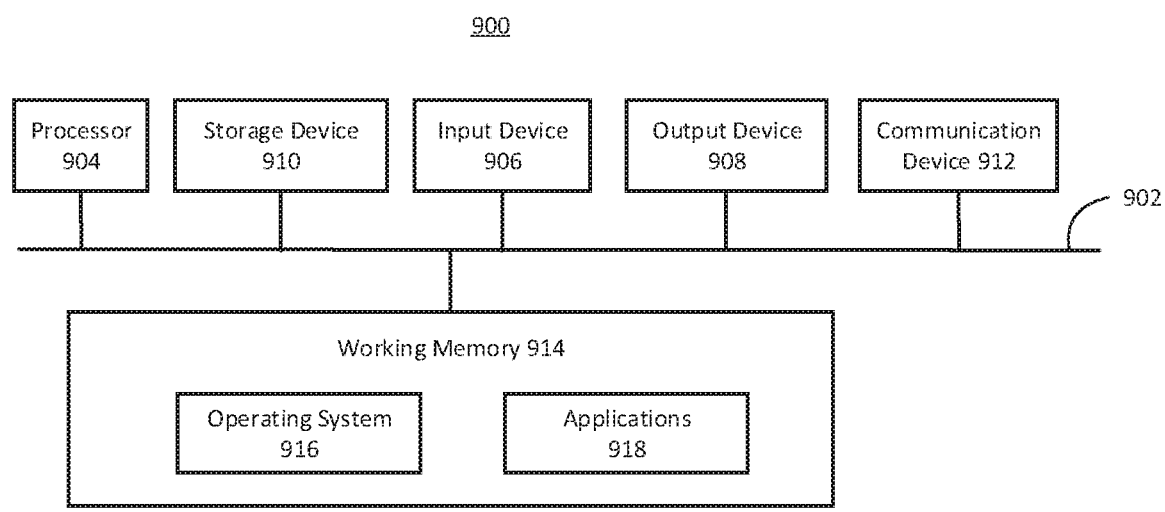
FIG. 14 illustrates a general hardware environment wherein the present disclosure is applicable in accordance with an exemplary embodiment of the present disclosure.

FIG. 14 illustrates a general hardware environment 900 wherein the present disclosure is applicable in accordance with an exemplary embodiment of the present disclosure.

With reference to FIG. 14, a hardware environment 900, which is an example of the hardware device that may be applied to the aspects of the present disclosure, will now be described. The hardware environment 900 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned control portion 6, identifying portion 11, detecting portion 12, billing portion 13 or service device 20 for providing parking service to the vehicle may be wholly or at least partially implemented by the hardware environment 900 or a similar device or system.

The hardware environment 900 may comprise elements that are connected with or in communication with a bus 902, possibly via one or more interfaces. For example, the hardware environment 900 may comprise the bus 902, one or more processors 904, one or more input devices 906 and one or more output devices 908. The one or more processors 904 may be any kinds of processors, and may comprise but are not limited to one or more general-purpose processors and/or one or more special-purpose processors (such as special processing chips). The input devices 906 may be any kinds of devices that can input information to the computing device, and may comprise but are not limited to a mouse, a keyboard, a touch screen, a microphone and/or a remote control. The output devices 908 may be any kinds of devices that can present information, and may comprise but are not limited to display, a speaker, a video/audio output terminal, a vibrator and/or a printer. The hardware environment 900 may also comprise or be connected with non-transitory storage devices 910 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 910 may be detachable from an interface. The non-transitory storage devices 910 may have data/instructions/code for implementing the methods and steps which are described above. The hardware environment 900 may also comprise a communication device 912. The communication device 912 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the hardware environment 900 is used as an on-vehicle device, it may also be connected to external device, for example, a GPS receiver, sensors for sensing different environmental data such as an acceleration sensor, a wheel speed sensor, a gyroscope and so on. In this way, the hardware environment 900 may, for example, receive location data and sensor data indicating the travelling situation of the vehicle. When the hardware environment 900 is used as an on-vehicle device, it may also be connected to other facilities (such as an engine system, a wiper, an anti-lock Braking System or the like) for controlling the traveling and operation of the vehicle.

In addition, the non-transitory storage device 910 may have map information and software elements so that the processor 904 may perform route guidance processing. In addition, the output device 906 may comprise a display for displaying the map, the location mark of the vehicle, images indicating the travelling situation of the vehicle and also the visual signals. The output device 906 may also comprise a speaker for audio output.

The bus 902 may include but is not limited to industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 902 may also include a Controller Area Network (CAN) bus or other architectures designed for application on an automobile.

The hardware environment 900 may also comprise a working memory 914, which may be any kind of working memory that may store instructions and/or data useful for the working of the processor 904, and may comprise but is not limited to a random access memory and/or a read-only memory device.

Software elements may be located in the working memory 914, including but are not limited to an operating system 916, one or more application programs 918, drivers and/or other data and codes. Instructions for performing the methods and steps described in the above may be comprised in the one or more application programs 918, and the units of the aforementioned control portion 6, identifying portion 11, detecting portion 12, billing portion 13 or service device 20 may be implemented by the processor 904 reading and executing the instructions of the one or more application programs 918. More specifically, the aforementioned control portion 6, identifying portion 11, detecting portion 12, billing portion 13 or service device 20 may, for example, be implemented by the processor 904 when executing an application 918 having instructions to perform the steps of the method 200. The executable codes or source codes of the instructions of the software elements may be stored in a non-transitory computer-readable storage medium, such as the storage device(s) 910 described above, and may be read into the working memory 914 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

The present disclosure being thus described, it will be obvious that the same may be varied in many ways. Such variations are not to be regarded as a departure from the spirit and scope of the present disclosure, and all such modifications as would be obvious to those skilled in the art are intended to be included within the scope of the following claims.

What is claimed is:

1. A parking space lock, comprising:
a fixing portion fixed in a parking space;
a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state;
a first communication portion configured to communicate with a service device;
a second communication portion configured to communicate with a vehicle associated with a first signal; and
a control portion configured to:
acquire a location of the vehicle;
when the location satisfies a condition, control the second communication portion to notify the vehicle of orientation and route information of the parking space; and
when receiving the first signal from the service device by the first communication portion, control the movable portion to move to/to be at the first position and maintain the parking space lock in the locked state,
wherein the location satisfies the condition when a distance between the vehicle and the parking space lock is less than a threshold.

2. The parking space lock of claim 1, further comprising:
a detecting portion configured to detect whether a vehicle is pulling into the parking space, wherein
the control portion is further configured to:
when detecting a vehicle associated with the first signal is pulling into the parking space, control the movable portion to move to the second position and maintain the parking space lock in the open state.

3. The parking space lock of claim 1, further comprising:
an inductive charging portion, wherein
the control portion is further configured to:
when detecting the vehicle is parked in the parking space, control the inductive charging portion to charge a battery in the vehicle.

4. The parking space lock of claim 1, further comprising:
a distance sensing portion, wherein
the control portion is further configured to:
when sensing an object within an unsafety range by the distance sensing portion, omit the first signal and notify the service device of the omission.

5. The parking space lock of claim 1, wherein
the second communication portion is further configured to communicate with the vehicle over LoRa network.

6. The parking space lock of claim 1, wherein
the control portion is further configured to:
according to a second signal received by the second communication portion from the vehicle, control the movable portion and maintain the parking space lock.

7. The parking space lock of claim 1, wherein
the service device is structured to be a part of the parking space lock,
the service device being configured to:
receive a reservation for the parking space from a vehicle;
determine whether the reservation is valid, and if the reservation is valid, —send the first signal to the first communication portion; and
send identifying information about the parking space to the vehicle.

8. A parking space lock, comprising:
a fixing portion fixed in a parking space;
a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state;
an identifying portion configured to identify a license number of a vehicle and determine whether the vehicle is registered based on the identified license number;
a detecting portion configured to detect whether a vehicle is pulling into or leaving the parking space;
a communication portion configured to communicate with a vehicle; and
a control portion configured to:
acquire a location of the vehicle;
when the location satisfies a condition, control the communication portion to notify the vehicle of orientation and route information of the parking space;

when detecting a vehicle is pulling into the parking space by the detecting portion and determining the vehicle is registered by the identifying portion, control the movable portion to move to/to be at the second position and maintain the parking space lock in the open state; and when detecting the vehicle is leaving the parking space by the detecting portion, control the movable portion to move to the first position and maintain the parking space lock in the locked state, wherein the location satisfies the condition when a distance between the vehicle and the parking space lock is less than a threshold.

9. The parking space lock of claim 8, further comprising:
a billing portion configured to start billing once detecting a vehicle is pulling into the parking space by the detecting portion, stop billing once detecting the vehicle is leaving the parking space by the detecting portion, and generate billing data, wherein
the control portion is further configured to:
after detecting the vehicle is leaving the parking space by the detecting portion, control the communication portion to send the billing data to the vehicle.

10. The parking space lock of claim 8, further comprising:
a status indicating portion configured to indicate whether the parking space is available visually.

11. The parking space lock of claim 8, further comprising:
a service device structured to be a part of the parking space lock,
the service device being configured to:
receive a reservation for the parking space from a vehicle;
determine the reservation is valid if the parking space is available and the vehicle is registered; and
send license number information of the vehicle to the identifying portion,
wherein the identifying portion is further configured to:
determine whether a vehicle is the one corresponding to the reservation based on the identified license number and the license number information, and
wherein the control portion is further configured to:
when detecting a vehicle is pulling into the parking space by the detecting portion and determining the vehicle is the one corresponding to the reservation by the identifying portion, control the movable portion to move to/to be at the second position and maintain the parking space lock in the open state.

12. A system for providing a vehicle with a parking service, comprising:
at least one parking space lock according to claim 1; and
a service device configured to:
receive a reservation for the parking space from a vehicle;
determine whether the reservation is valid; and
if the reservation is valid, send the first signal to the first communication portion, and send identifying information about the parking space to the vehicle.

13. A system for providing a vehicle with a parking service, comprising:
a service device, and
a parking space lock comprising:
a first communication portion configured to communicate with the service device;
a fixing portion fixed in a parking space;
a movable portion structured to move between a first position and a second position with respect to the fixing portion so as to make the parking space lock change between a locked state and an open state, wherein no vehicle is allowed to enter the parking space when the parking space lock is in the locked state, and a vehicle is allowed to enter the parking space when the parking space lock is in the open state;
an identifying portion configured to identify a license number of a vehicle;
a detecting portion configured to detect whether a vehicle is pulling into or leaving the parking space;
a second communication portion configured to communicate with a vehicle; and
a control portion configured to:
acquire a location of the vehicle;
when the location satisfies a condition, control the second communication portion to notify the vehicle of orientation and route information of the parking space;
when detecting the vehicle is leaving the parking space by the detecting portion, control the movable portion to move to the first position and maintain the parking space lock in the locked state, wherein
the service device is configured to:
receive a reservation for the parking space from a vehicle;
determine the reservation is valid if the parking space is available and the vehicle is registered; and
send license number information of the vehicle to the parking space lock via the first communication portion,
wherein the identifying portion is further configured to:
determine whether a vehicle is the one corresponding to the reservation based on the identified license number and the license number information received from the service device,
wherein the control portion is further configured to:
when detecting a vehicle is pulling into the parking space by the detecting portion and determining the vehicle is the one corresponding to the reservation by the identifying portion, control the movable portion to move to/to be at the second position and maintain the parking space lock in the open state, and
wherein the location satisfies the condition when a distance between the vehicle and the parking space lock is less than a threshold.

* * * * *